(12) United States Patent
Hubbard et al.

(10) Patent No.: US 8,524,134 B2
(45) Date of Patent: Sep. 3, 2013

(54) METHOD OF MOLDING POLYMERIC MATERIALS TO IMPART A DESIRED TEXTURE THERETO

(76) Inventors: Graham J. Hubbard, Wantage (GB); Keith P. Parsons, Swindon (GB)

( * ) Notice: Subject to any disclaimer, the term of this patent is extended or adjusted under 35 U.S.C. 154(b) by 251 days.

(21) Appl. No.: 12/834,180

(22) Filed: Jul. 12, 2010

(65) Prior Publication Data
US 2012/0007273 A1    Jan. 12, 2012

(51) Int. Cl.
B29C 33/40    (2006.01)
(52) U.S. Cl.
USPC .......................................... 264/219; 264/293
(58) Field of Classification Search
USPC .................................. 264/219, 293
See application file for complete search history.

(56) References Cited

U.S. PATENT DOCUMENTS

| | | | |
|---|---|---|---|
| 4,118,235 A | 10/1978 | Horiuchi et al. | |
| 5,962,561 A | 10/1999 | Turshani et al. | |
| 6,123,890 A * | 9/2000 | Mazurek et al. | 264/293 |
| 6,359,735 B1 | 3/2002 | Gombert et al. | |
| 6,783,719 B2 | 8/2004 | Robinson et al. | |
| 7,066,234 B2 * | 6/2006 | Sawitowski | 164/72 |
| 7,629,027 B2 | 12/2009 | Moran et al. | |
| 7,713,768 B2 * | 5/2010 | Masuda et al. | 438/29 |
| 2002/0130441 A1 | 9/2002 | Robinson et al. | |
| 2002/0135099 A1 * | 9/2002 | Robinson et al. | 264/236 |
| 2003/0020210 A1 | 1/2003 | Robinson et al. | |
| 2003/0025234 A1 * | 2/2003 | Gough et al. | 264/127 |
| 2004/0245659 A1 * | 12/2004 | Glenn et al. | 264/1.24 |
| 2007/0289874 A1 * | 12/2007 | Masuda et al. | 205/171 |
| 2008/0173994 A1 | 7/2008 | Nnebe | |
| 2008/0211133 A1 * | 9/2008 | Terasaki et al. | 264/219 |
| 2009/0046362 A1 * | 2/2009 | Guo et al. | 359/486 |
| 2009/0194914 A1 * | 8/2009 | Uozu et al. | 264/496 |
| 2010/0143595 A1 * | 6/2010 | Nara et al. | 427/299 |
| 2010/0178466 A1 * | 7/2010 | Masuda et al. | 428/156 |

FOREIGN PATENT DOCUMENTS

JP    2003-043203    2/2003

OTHER PUBLICATIONS

Self-Ordering of Cell Configuration of Anodic Porous Alumina with Large-Size Pores in Phosphoric Acid Solution; Masuda, et al.; Jpn. J. Appl. Phys., vol. 17, 1998, pp. L1340-L1342.
Replication of high-aspect-ratio nanopillar array for biomimetic gecko foot-hair prototype by UV nano embossing with anodic aluminum oxide mold, Dong Sung Kim et al., Microsyst Technol, 2007, 13:601-606.

(Continued)

*Primary Examiner* — Christina Johnson
*Assistant Examiner* — Saeed Huda
(74) *Attorney, Agent, or Firm* — Carmody & Torrance LLP (57) ABSTRACT

A method of molding a polymeric material to create a desired texture therein using an alumina mold having a plurality of cylindrical pores disposed therein, the method comprising the steps of: a) providing a porous alumina master having a plurality of cylindrical pores dispersed therein, said plurality of cylindrical pores corresponding to projections to be imparted to a surface of a film; disposing a polymeric material between a film and the porous alumina master; and c) applying mechanical pressure to roll the porous alumina master into the polymeric material, wherein the texture imparted to the polymeric molding material comprises projections corresponding to the cylindrical pores of the porous alumina master. A release agent is applied to the porous alumina master prior to disposing the polymeric molding material between the porous alumina master and the film.

20 Claims, 9 Drawing Sheets

(56) References Cited

OTHER PUBLICATIONS

Anti-Reflection Structures on Lenses by Nanoimprinting Using Ordered Anodic Porous Alumina, Takashi Yanagishita et al., Applied Physics Express 2, 2009, 022001-1-022001-3.

Nondestructive Replication of Self-Ordered Nanoporous Alumina Membranes via Cross-Linked Polyacrylate Nanofiber Arrays, Silko Grimm et al., Nano Letters, 2008, vol. 8, No. 7, 1954-1959.

Antireflection Polymer Hole Array Structures by Imprinting Using Metal Molds from Anodic Porous Alumina, Takashi Yanagishita et al., Applied Physics Express 1, 2008, 067004-1-067004-3.

Nanoimprinting Using Ni Molds Prepared from Highly Ordered Anodic Porous Alumina Templates, Takashi Yanagishita et al., Japanese Journal of Applied Physics, vol. 45, No. 30, 2006, pp. L804-L806.

Fluorolink Surface Treatment Agents, Product Data Sheet, Solvay Solexis, Dec. 31, 2002, 1-4.

\* cited by examiner

METHOD OF MOLDING POLYMERIC MATERIALS TO IMPART A DESIRED TEXTURE THERETO

FIELD OF THE INVENTION

The present invention relates generally to methods of molding polymeric materials to impart a desired texture thereto and compositions for improving the release properties of alumina masters used to create the molds.

BACKGROUND OF THE INVENTION

Polymer molding materials are widely used to make a wide variety of materials, including for example various display devices. It is often desirable and/or necessary to provide an anti-reflective layer or textured surface on such display devices to inhibit reflected light to ensure satisfactory visibility. Various methods have been suggested for producing such anti-reflective layers, including, for example, using vacuum deposition or sputtering to provide a multi-layered film composed of dielectrics having different refractive indices.

It has also been suggested to use a porous alumina master having an arrangement of depressions or pores corresponding to projections to be imparted to the surface of the polymer molding material to create an anti-reflective layer in polymeric molding materials.

The depressions or pores formed in the porous alumina master for forming corresponding projections on the surface of the polymer molding material typically have an extremely low period as compared with the wavelength of light, and for example, may have a depth of about ¼ the wavelength to adequately attenuate reflectance in the visible light range.

U.S. Patent Publication No. 2007/0289874 to Masuda et al., the subject matter of which is herein incorporated by reference in its entirety describes a method of producing a non-reflective polymer film by repeating anodic oxidation at about the same formation voltage and pore diameter enlargement treatment, and using anodic oxidized porous alumina, to which a tapered shape has been, imparted in which pore diameter continuously changes, as a mold. The anodized porous alumina surface is used as a mold, or a stamper for imparting projections to the surface of a polymeric molding material to create an anti-reflective layer therein.

After carrying out anodic oxidation for a predetermined amount of time to form pores having a desired depth, pore diameter enlargement treatment is carried out by immersing the mold in a suitable acidic solution. Subsequently, by carrying out anodic oxidation at a formation voltage approximately equal to that of the anodic oxidation previously carried out, pores having a smaller diameter as compared with the first stage are formed. Subsequently, when anodic oxidation and pore diameter enlargement treatment are repeated, as a result of carrying out anodic oxidation at about the same formation voltage as the previous anodic oxidation, the pores to be formed are formed perpendicular to the direction of film thickness, thereby making it possible to form pores having a regular tapered shape. By repeating this procedure, an oxidized porous alumina substrate having pores with a tapered shape can be obtained.

The inventors of the present invention have determined that cylindrical pores, i.e., those have straight sides versus tapered, provide just as good a result as tapered pores for optical performance. One of the reasons that tapered pores have been preferred to cylindrical pores is that they have been significantly easer to obtain release from in standard pattern transfer processes.

Based thereon, the present invention relates in part to an anti-reflective layer (anti-reflective film) formed on the surface of a polymer molding material which reduces reflection in the visible light range and a production method thereof. In addition, the present invention relates generally to a master, preferably of alumina, having cylindrical pores disposed therein for forming a desired texture in the surface of the polymeric molding material, such as an anti-reflective layer and a production method thereof.

The present invention also relates generally to the production of porous alumina molds having cylindrical pores disposed therein utilizing a series of electrochemical steps, wherein the porous alumina mold is treated with a release coating to facilitate removal of polymer molding material from the porous alumina mold.

SUMMARY OF THE INVENTION

It is an object of the present invention to provide a method of producing a porous alumina master that is capable of imparting a desired texture to a polymeric molding material.

It is an object of the present invention to provide a method of producing a porous master, preferably of alumina (comprising aluminum), that is capable of imparting an antireflective layer to a polymeric molding material.

It is another object of the present invention to provide a method producing a porous master, preferably of alumina, having cylindrical pores disposed therein.

It is another object of the present invention to provide a porous master, preferably of alumina, having a release coating disposed thereon to facilitate removal of the polymeric molding material from the porous master.

It is an object of the present invention to provide a method for producing an anti-reflective layer which is able to form a desired anti-reflective layer on the surface of a polymer molding material from the porous master.

To that end, in one embodiment, the present invention relates generally to a method of molding a polymeric material to create a desired texture therein using a mold, preferably of alumina, having a plurality of cylindrical pores disposed therein, the method comprising the steps of a) providing a porous master having a plurality of cylindrical pores dispersed therein, said plurality of cylindrical pores corresponding to projections to be imparted to a surface of the polymeric molding material;

b) disposing a polymeric molding material between a transparent film and the porous master; and c) applying mechanical pressure to roll the porous master into the polymeric molding material, wherein the texture imparted to the polymeric molding material comprises projections corresponding to the cylindrical pores of the porous master.

In another preferred embodiment, a release agent is applied to the porous master prior to disposing the polymeric molding material between the porous master and the transparent film.

DETAILED DESCRIPTION OF THE PREFERRED EMBODIMENTS

The present invention relates generally to a method of molding a polymeric material to, create a desired texture therein using a mold, preferably of alumina, having a plurality of cylindrical pores disposed therein, the method comprising the steps of a) providing a porous master having a plurality of cylindrical pores dispersed therein, said plurality of cylindrical pores corresponding to projections to be imparted to a surface of the polymeric molding material;

b) disposing a polymeric molding material between a film and the porous master; and c) applying mechanical pressure to roll the porous master into the polymeric molding material, wherein the texture imparted to the polymeric molding material comprises projections corresponding to the cylindrical pores of the porous master. The porous master preferably comprises alumina and is preferably cylindrical in shape. The film is preferably transparent or translucent. The polymeric molding material is preferably photosensitive resin which can be cured using radiation, preferably by exposing the photosensitive resin through the film.

In another preferred embodiment, a release agent is applied to the porous master prior to disposing the polymeric molding material between the porous master and the film.

In one embodiment, the process described herein uses a treatment agent in the replicating polymeric molding material which enables consistent high quality release on many replications. Therefore, the invention described herein does not gain any benefit from the use of tapered pores. What is meant by "cylindrical pores" as described herein is pores that have substantially the same diameter along the depth of the pore and that do not appreciably taper in diameter from a surface of the porous master along the depth of the pore created therein.

A number of steps are required for anodizing an aluminum surface to obtain a porous alumina texture with an appropriate surface chemistry for use as a mold or mold master (porous master) for replication of a photosensitive resin or other polymeric mold material into film. These steps include:

1) First stage anodization;
2) Oxide etching;
3) Second stage anodization; and
4) Pore widening.

These steps, as described in detail herein, produce a porous alumina surface having cylindrical pores which can then be used for molding material such as photosensitive resins or other polymeric mold materials to produce antireflective coatings and other similar materials. The inventors of the present invention have found that cylindrical pores provide better optical and structural performance than the tapered pores of the prior art.

However, in order to satisfactorily obtain release of the polymeric mold material from the alumina mold having cylindrical pores, it is generally necessary to perform a release treatment step on the porous alumina surface after the pore widening step has been completed as discussed in greater detail herein.

In the first stage anodization step, the aluminum surface is immersed in an electrolyte and anodized under controlled conditions of voltage, current and temperature. The distance between the aluminum surface (anode) and the containing chamber lining (cathode) is not critical, but typically needs to be sufficient to allow a good flow of electrolyte. The thickness of the cathode is also not critical and a suitable material is stainless steel. Other materials usable as the cathode include carbon, lead and nickel, by way of example and not limitation.

The solution typically needs to be agitated during electrolysis to maintain a homogeneous composition. For example, if the electrolyte is continuously pumped through the electrolytic chamber via an inlet/outlet to and from a reservoir, sufficient agitation can be provided.

The structure of the porous alumina surface and thus the structure of the photosensitive film thus produced can be controlled to a certain extent by the proper selection of the anodizing conditions. For example, it is possible to control, to a certain extent, the distance between narrow pores by the anodizing voltage, the depth of the pores by treatment time, and the pore diameter by a pore-widening treatment.

An aqueous solution of oxalic acid, sulfuric acid, phosphoric acid, and the like can be used for the electrolyte during this first stage anodization step. Among these, oxalic acid and phosphoric acid are preferred.

In the case of using oxalic acid for the electrolyte, the concentration of the electrolyte is preferably 0.7 M or less, more preferably about 0.3 M or less. If the concentration is higher than 0.7 M, the current value becomes excessively high which may result in roughening of the surface. On the other hand, when the concentration is too low, the speed of anodic oxidation decreases, so the concentration of the electrolyte is preferably 0.01 to 0.5 M.

The temperature of the electrolyte is preferably 30° C. or lower, and more preferably 20° C. or lower. If the temperature of the electrolyte is higher than 30° C., the phenomenon preferred to as "scorching" occurs, which may damage the structure or melt the surface, and cause a disturbance in the regularity. On the other hand, when the temperature of the electrolyte is too low, the speed of anodic oxidation decreases, so the temperature of the electrolyte is preferably 0° C. or higher.

The formation voltage for an oxalic acid based electrolyte is typically in the range of about 30 to 60 V, preferably 35 to 45 V, and more preferably 39 to 41 V. If the formation voltage is above or below this range, regularity tends to decrease, and pores having pore diameter and pore period larger than the wavelength of visible light may be obtained.

In the case of using phosphoric acid for the electrolyte, the concentration of the electrolyte is preferably 0.7 M or less, more preferably about 0.3 M or less. In addition, the formation voltage is preferably 80 to 100 V, more preferably 85 to 95 V.

One example of suitable process parameters using an oxalic acid electrolyte composition is as follows:

Electrolyte composition: 0.3 M oxalic acid in water (27 g/dm$^3$)
Temperature to be maintained: 17±2° C.
Constant voltage: 40 V
Steady state current density: 3 mA/cm$^2$
Electrolysis time: 6 hours Current density (or current) is measured and recorded during the electrolysis. The current density will typically "spike" in the first few seconds of electrolysis before relaxing to the steady state value once the oxide starts to deposit. The temperature at the aluminum surface is also measured and recorded during the electrolysis.

After completion of this first anodization stage, the aluminum part is rinsed with deionized water.

Thereafter, the anodized aluminum surface is oxide etched, for example by immersing the surface in an aqueous solution of 0.2 M chromic acid and 0.4 M phosphoric acid at 60° C. for about 1 hour.

These first two steps may be performed together multiple times. In one preferred embodiment, the first stage anodization step and the oxide etch step are each performed three times. When these steps are performed multiple times, the first stage anodization step may be performed for about 25 to about 35 minutes each time and the oxide etch step performed for about 10 to about 15 minutes each time.

Next, a second stage anodization step is performed in the same way as for the first stage, using the same equipment, materials and processing conditions. However, the electrolysis time for this second anodization step is much shorter, preferably about 1 to about 5 minutes. In one embodiment, this second stage anodization step is performed for about 90 seconds.

Next, a pore widening step is performed by immersing the anodized aluminum surface in a solution of 5% phosphoric acid in water at 30±2° C. for 10 to 15 minutes. No agitation is required. At the end of this step, the aluminum part is again rinsed with deionized water.

Finally, the anodized alumina part is contacted with a release treatment composition and under conditions specific to the particular release agent for a period of time to impart release properties to the surface of the porous alumina part.

The release treatment composition typically comprises a material selected from the group consisting of alkylphosphonic acids, arylphosphonic acids, fluoroalkylsilanes, perfluorochlorosilanes, fluorinated alkyl and arylphosphonic acids, organofunctional silanes and combinations of one or more of the foregoing. Exemplary alkylphosphonic acids include those available from Strem Chemicals, such as n-decylphosphonic acid, n-dodecylphosphonic acid, n-hexylphopshonic acid, n-hexadecylphosphonic acid, n-octylphosphonic acid and n-octadylphosphonic acid and n-tetradecylphosphonic acid. Exemplary fluoroalkylsilanes including those available from Daikin Industries under the tradename Optool DSX.

In one preferred embodiment, the release treatment agent comprises 1-decylphosphonic acid. For example, the release treatment solution may comprise an 0.1% solution of 1-decylphosphonic acid in ethanol. The anodized part is immersed in the release treatment composition for an extended period of time. For example, the anodized part may be immersed or otherwise contacted with the release treatment composition for at least 10 hours, more preferably for at least 20 hours. In one embodiment, the anodized alumina part is immersed in the 1-decylphosphonic acid for 20 hours at 20° C. It is noted that temperature control for this process is not critical.

After removal from the 1-decylphosphonic acid solution, the treated anodized part is rinsed with a solvent such as ethanol. Other suitable solvents include propanol, butanol, methanol, methyl ethyl ketone and acetone, by way of example and not limitation.

In another preferred embodiment, the release treatment composition comprises a fluoro alkyl silane which is applied by baking the anodized alumina part in the preence of the fluoro alkyl silane for a period of time. For example, the anodized alumina part may be baked in the presence of 1H,1H,2H,2H-perfluorodecyltrichlorosilane at 130° C. for at least one hour, preferably for at least two hours. Other suitable organo functional silanes include perfluorohexyl trichlorosilane, perfluorooctyl trichlorosilane, perfluorodecyl trichlorosilane, perfluorododecyl trichlorosilane, perfluorohexylpropyl trichlorosilane n-decyltrichlorosilane and n-octadecyltrichlorosilane.

In another preferred embodiment, the release treatment composition comprises a functional perfluoropolyether material, such as Fluorolink F10 (available from Solvay Solexis, Inc.), which is a diphosphonate derivative based on a linear perfluoropolyether backbone. In this instance, the porous alumina surface may be dipped in a solution of, for example, 80% Fluorolink F10 in ethanol, and then baked at 100° C. for about 60 minutes.

With the mold produced in accordance with the present invention, a photosensitive resin sheet or other similar material having the microscopic pattern on the surface can be produced. For producing the sheet having the microscopic pattern on the surface, an actinic radiation curable composition is filled between the mold produced according to the present invention and a substrate (preferably a transparent or translucent plastic sheet), and cured by exposing the photosensitive resin to actinic radiation followed by demolding. The curable composition may be filled between the mold and the transparent sheets in various ways. For example, the actinic radiation curable composition may be fed between the mold and the transparent sheet from a nip roll, may be coated onto the mold and then laminated with the transparent sheet, or pressure and/or heat may be used to roll the porous alumina surface into the photosensitive resin.

In the alternative, the desired texture or structure of the mold may be transcribed onto the actinic radiation curable composition, which is then demolded and cured by exposure to actinic radiation.

In either process, the composition may additionally be exposed to actinic radiation after demolding.

There is no particular restriction on the transparent sheet to be used according to the present invention, insofar as it does not substantially inhibit exposure of the photosensitive resin to actinic radiation through the transparent sheet. Examples thereof include methyl methacrylate (co)polymers, polycarbonates, styrene (co)polymers, methyl methacrylate-styrene copolymers, cellulose diacetates, cellulose triacetates, cellulose acetate butyrates, polyesters, polyamides, polyimides, polyether sulfones, polysulfones, polypropylenes, polymethylpentenes, polyvinylchlorides, polyvinyl acetals, polyetherketones, polyurethanes, and glass. The sheet may be a sheet or a film, and coated or treated by corona discharge on the surface for improving tight contact, antistatic property, abrasion-resistance or weather resistance. In a preferred embodiment, the transparent sheet is polyethylene terephthalate.

Specific examples of the source of actinic radiation usable in the present invention include visible light sources, UV light sources, electron beams, plasma, and infrared light sources and would generally be well known to those skilled in the art.

The radiation sensitive or photosensitive resin composition according to the present invention is a photosensitive resin, including, for example, acrylate resins, poly-methyl methacrylate resin, vinylchloride resins, polycarbonate resins, phenolic resins, epoxy resins and polyurethane resins, all in combination with a suitable photoinitiator such as benzoyl peroxide. Other resins and other photoinitiators would also be usable in the present invention and are generally well known to those skilled in the art. An example of a suitable photosensitive resin is a photosensitive acrylic resin composition.

Other additives may also be added to the photosensitive resin composition, including, for example, antistatic agents, mold releasing agents and fluorine compounds for improving an antifouling property, by way of example and not limitation.

Irradiation of the actinic energy ray is conducted, for example, by a high-pressure mercury lamp. Although there is no particular restriction on the quantity of the light irradiation energy insofar as curing of the actinic energy ray curable composition occurs, the energy quantity is preferably 100 to 10,000 mJ/cm$^2$.

The sheet material having a desired texture produced in accordance with the present invention is expected to be applicable to optical articles, including, for example, antireflective films, antireflective coatings, antireflective parts, optical-waveguides, relief holograms, lenses, and polarization splitting elements; sheets for cell culture; super-water repellent films; and super-hydrophilic films; and is especially suitable for use as antireflective films, antireflective coatings and antireflective parts, including, for example liquid crystal display devices, plasma display panels, electroluminescence display panels, cathode tube display devices; an antireflective coating, an antireflection film or an antireflective sheet for a surface of lenses, show windows, display cases, indicator panels, indicator covers and eye-glasses.

The antireflection sheet may have an anti-glare function to scatter outside light. The anti-glare function can be imparted by superposing a desired texture not larger than the wavelength of visible light of the present invention on the surface of a stochastic structure not smaller than the wavelength of visible light.

In one embodiment, the desired texture of the mold of the present invention has a short period that is not larger than the wavelength of visible light, which is less than about 400 nm. The period beyond 400 nm causes scattering of visible light and is therefore not suitable for an optical use such as an antireflection film.

The invention will now be described with reference to the following non-limiting examples:

EXAMPLE 1

A 99.999% purity 2-inch aluminum disc was polished using techniques familiar to those skilled in the art and anodized at 40 V in 0.30 M oxalic acid solution at 17° C. for 25 minutes.

After each of three anodization stages, the oxide layer was etched away by immersing for 10 minutes in a 0.2 M chromic acid plus 0.4 M phosphoric acid solution at 60° C.

The sample was then further anodized at 40 V in 0.3 M oxalic acid solution at 17° C. for 90 seconds. This was followed by a pore widening treatment in 5% phosphoric acid at 30° C. for 12 minutes.

The porous alumina was then soaked in a 1% alkylphosphonic acid (APA) solution in ethanol for 20 hours.

A photosensitive resin was applied between a polyethylene terephthalate film and the porous alumina mold that was created. Mechanical pressure was applied as the porous alumina mold was rolled into the resin. The resin was cured by UV light creating a thin solid coating of nano-structured resin on the polyethylene terephthalate base film when removed from the porous alumina master.

Figure 1:
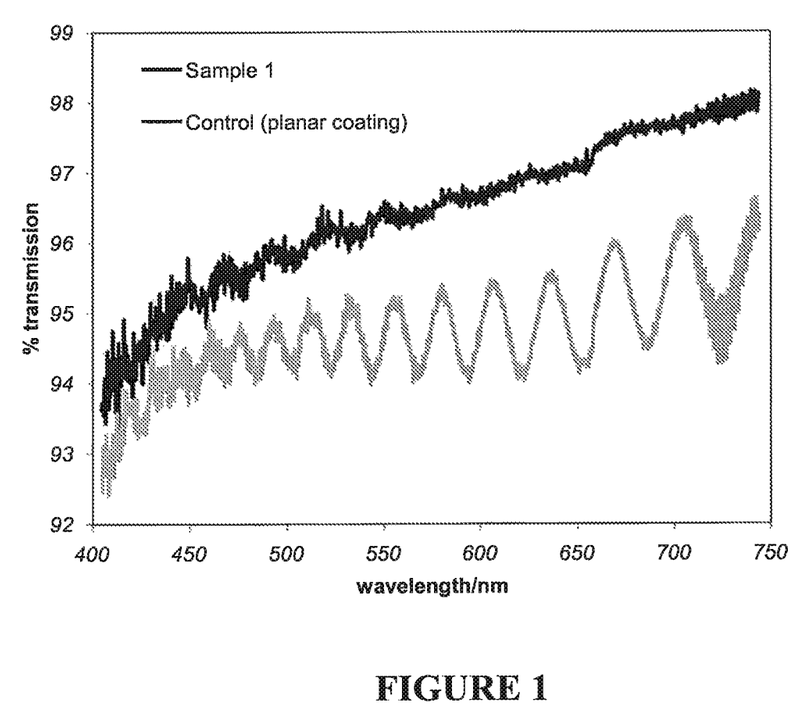
FIG. 1 shows % transmission for the film produced using this invention as compared with a polyethylene terephthalate film coated with the same photosensitive resin but cast against a smooth chrome roller surface to give a planar surface.

FIG. 1 shows % transmission for the film produced (sample 1) compared with a polyethylene terephthalate film coated with the same photosensitive resin but cast against a smooth chrome roller surface to give a planar surface.

Figure 2:
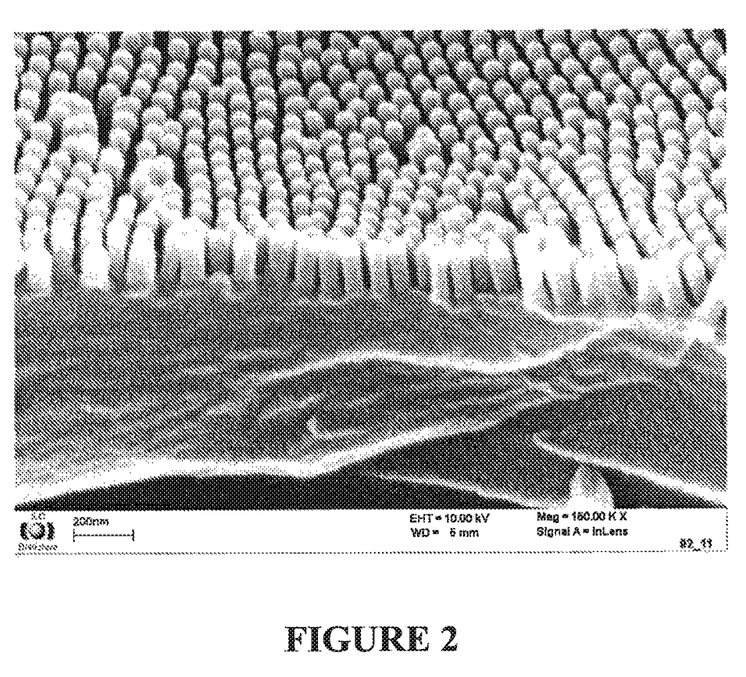
FIG. 2 shows an SEM image of a nanostructuring having spacing of 100 nm and depth of 180 nm which was created with this invention.

FIG. 2 shows an SEM image of sample 1 showing a nano-structuring having spacing of 100 nm and depth of 180 nm.

EXAMPLE 2

A 99.999% purity 2-inch aluminum disc was polished using techniques familiar to those skilled in the art and anodized at 92 V in 0.40 M phosphoric acid solution at 19° C. for 6 hours.

The oxide layer was etched away by immersing for 60 minutes in a 0.2 M chromic acid plus 0.4 M phosphoric acid solution at 60° C.

The sample was then further anodized at 92 V in 0.4 M phosphoric acid solution at 19° C. for four minutes. This was followed by a pore widening treatment in 5% phosphoric acid at 30° C. for 10 minutes.

The porous alumina was then soaked in a 1% alkylphosphonic acid (APA) solution in ethanol for 20 hours.

A photosensitive resin was applied between a polyethylene terephthalate film and the porous alumina sample. Mechanical pressure was applied as the porous alumina was rolled into the resin. The resin was cured by UV light creating a thin solid coating of nanostructured resin on the polyethylene terephthalate base film when removed from the porous alumina master.

Figure 3:
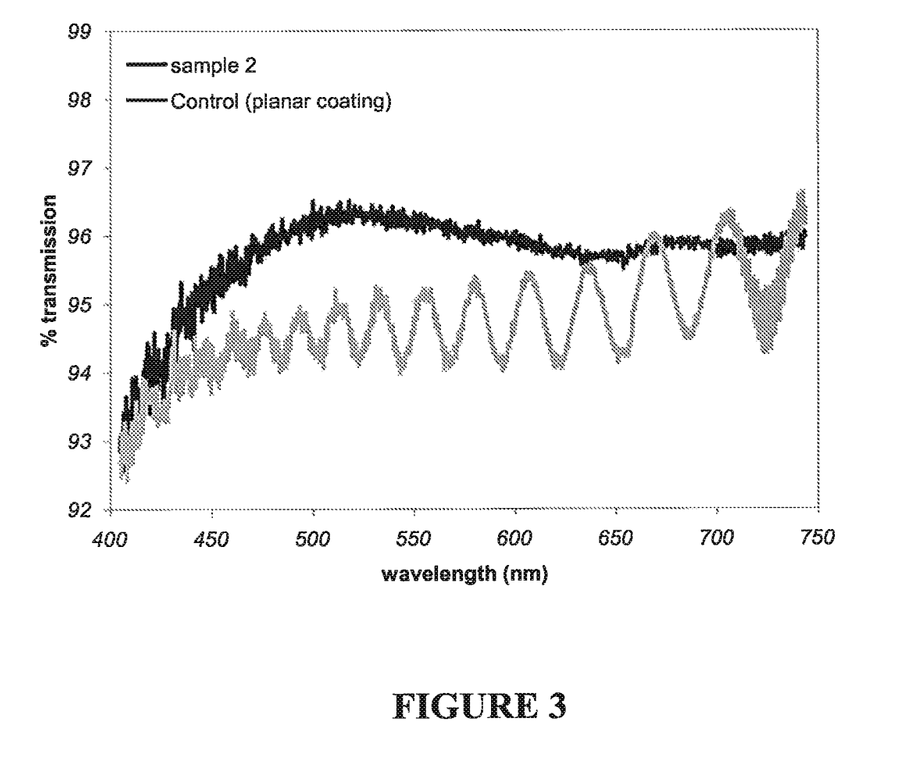
FIG. 3 shows a transmission spectrum of a further sample created with this invention as compared to a planar coating of photosensitive resin.

FIG. 3 shows a transmission spectrum of sample 2 compared to a planar coating of photosensitive resin.

Figure 4:
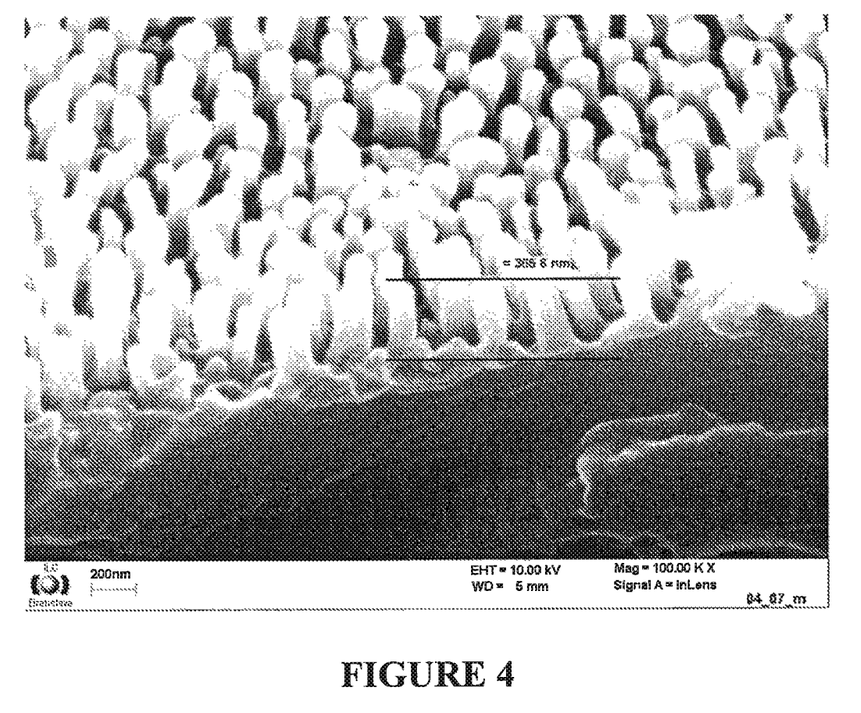
FIG. 4 shows an SEM image of a further sample created with this invention showing a nanostructure of spacing 230 nm and depth 380 nm.

FIG. 4 shows an SEM image of sample 2 showing a nano-structure of spacing 230 nm and depth 380 nm.

EXAMPLE 3

A 99.999% purity 2-inch aluminum disc was polished using techniques familiar to those skilled in the art and anodized at 40 V in 0.30 M oxalic acid solution at 17° C. for 6 hours.

The oxide layer was etched away by immersing for 60 minutes in a 0.2 M chromic acid plus 0.4 M phosphoric acid solution at 60° C.

The sample was then further anodized at 40 V in 0.3 M oxalic acid solution at 17° C. for 90 seconds. This was followed by a pore widening treatment in 5% phosphoric acid at 30° C. for 7 minutes.

The porous alumina was then cut into fragments. One fragment was soaked in a 1% alkylphosphonic acid (APA) solution in ethanol for 20 hours. Another fragment was left untreated.

A photosensitive resin was applied between a polyethylene film and both porous alumina samples. Mechanical pressure was applied as the porous alumina was rolled into the resin. The resin was cured by UV light creating a thin solid coating of nano-structured resin on the polyethylene terephthalate base film when removed from the porous alumina master.

Figure 5:
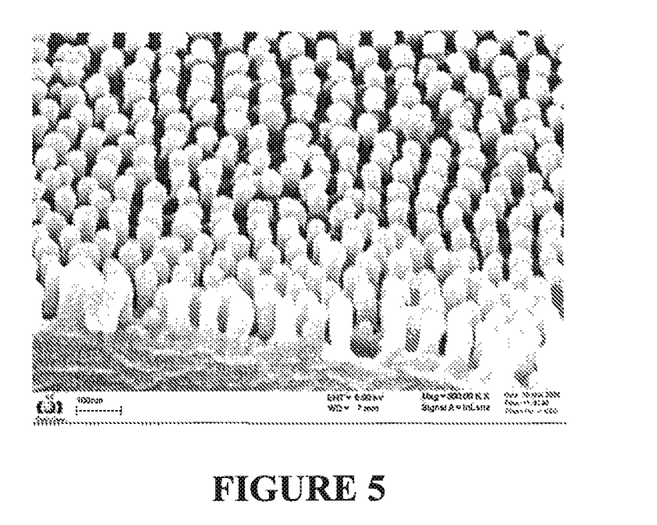
FIG. 5 shows an SEM image of a resulting structured photosensitive resin when the porous alumina is treated with APA prior to replication.
Figure 6:
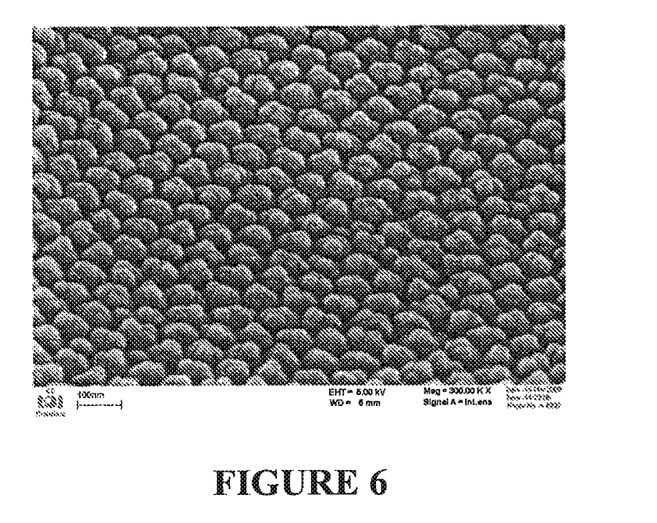
FIG. 6 shows an SEM image of the resulting structured photosensitive resin when the porous alumina is not treated prior to replication.

FIGS. 5 and 6 show SEM images of the structure formed in the resin with and without APA treatment of the porous alumina mold.

EXAMPLE 4

A 99.999% purity aluminum sample was prepared and anodized in the same way as in Example 3.

After the 90 second 40V anodization, the sample was baked in the presence of 1H, 1H, 2H, 2H-perfluorodecyltrichlorosilane at 130° C. for 2 hours.

A photosensitive resin was applied between a polyethylene terephthalate film and both porous alumina samples. Mechanical pressure was applied as the porous alumina was rolled into the resin. The resin was cured by UV light, creating a thin solid coating of nano-structured resin on the polyethylene terephthalate base film when removed from the porous alumina master.

Figure 7:
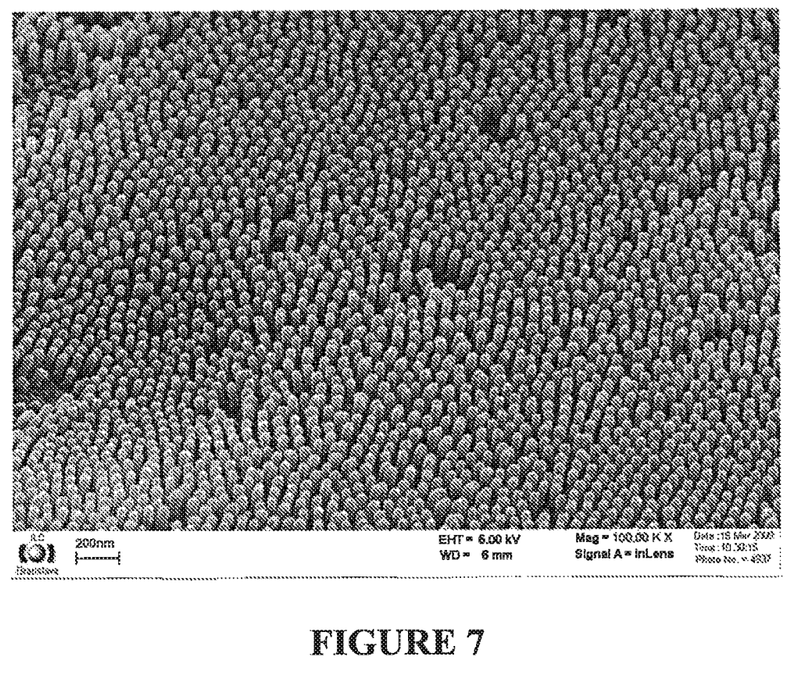
FIG. 7 shows an SEM image of resulting resin structure after perfluorodecyltrichlorosilane treatment of the porous alumina master prior to replication.
Figure 8:
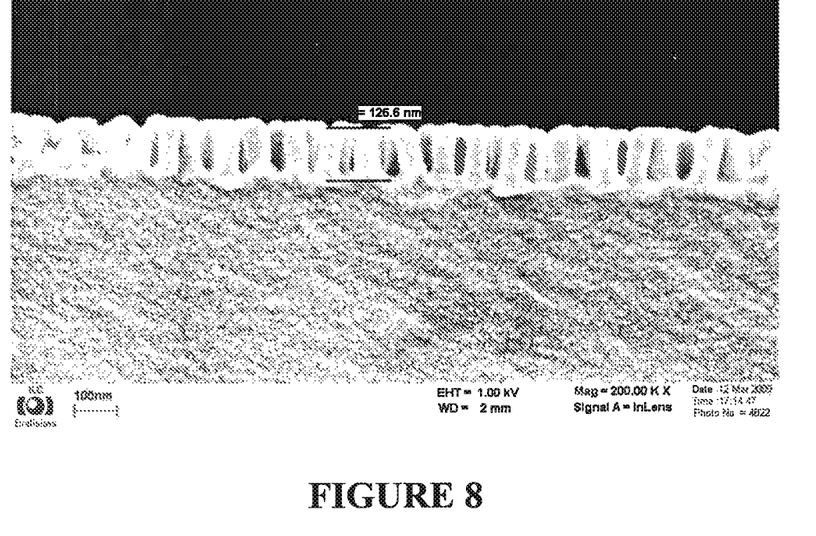
FIG. 8 shows a cross-sectional SEM image of resulting resin structure after perfluorodecyltrichlorosilane treatment of porous alumina master is applied prior to replication.

FIGS. 7 and 8 show SEM images of the structure formed in the resin after perfluorodecyltrhichlorosilane treatment of the porous alumna mold.

EXAMPLE 5

A 99.999% purity aluminum sample was prepared and anodized in the same way as in Example 3. After the 90 second 40V anodization, the sample was dipped in 80% Fluorolink F10—a diphosphonate derivative based on a linear perfluoropolyether backbone in ethanol then baked at 100° C. for 60 minutes.

A photosensitive resin was applied between a polyethylene terephthalate film and the both porous alumina samples. Mechanical pressure was applied as the porous alumina was rolled into the resin. The resin was cured by UV light creating a thin solid coating of nano-structured resin on the polyethylene terephthalate base film when removed from the porous alumina master.

Figure 9:
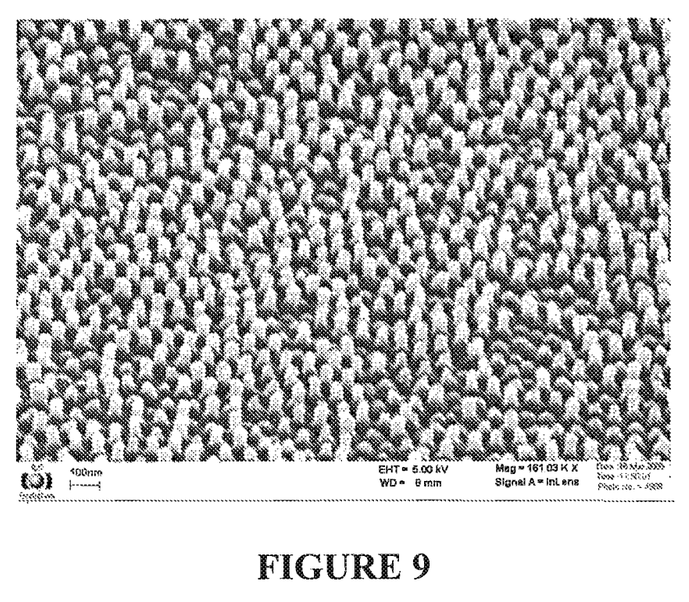
FIG. 9 shows an SEM image of the resulting resin structure after Fluorolink F10 treatment of the porous alumina master prior to replication

FIG. 9 shows an SEM image of the structure formed in the resin after Fluorolink F10 treatment of the porous alumina mold.

Figure 10:
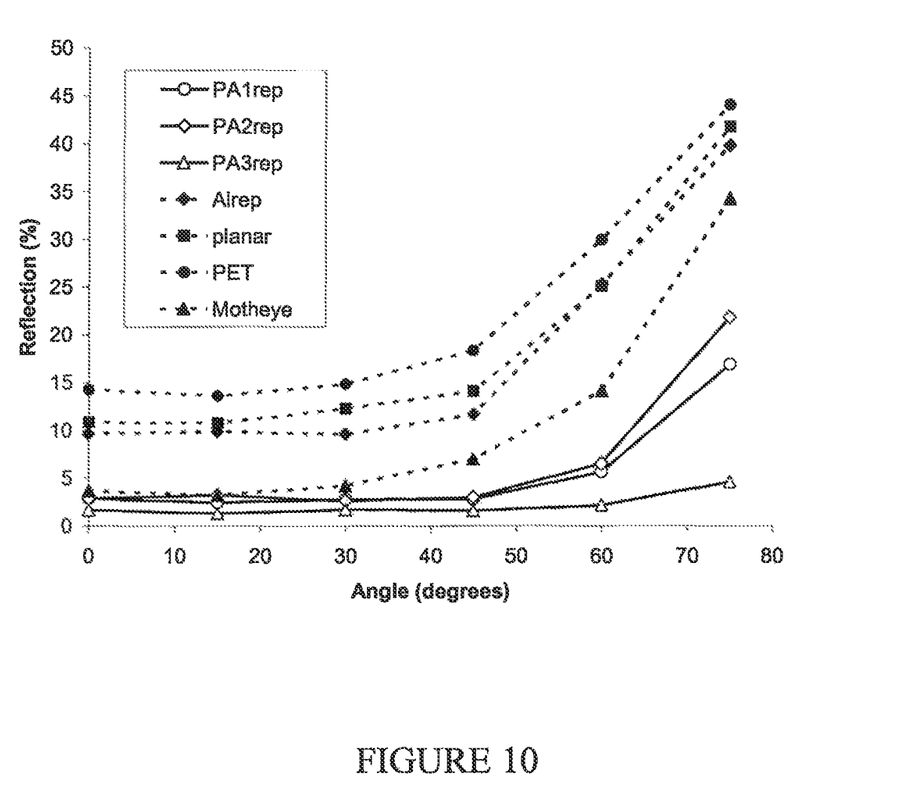
FIG. 10 is a plot that depicts angle dependent % reflection averaged over the 400 to 750 nm wavelength range, for a variety of structures.

FIG. 10 is a plot that depicts angle dependent % reflection averaged over the 400 to 750 nm wavelength range, for a variety of structures. The key data is PA1, which was produced from conical (i.e., tapered) pores and PA2, which was produced from cylindrical pores. It can be seen from FIG. 10 that there is little difference in reflectivity up to a viewing angle of 60 degrees, which would be the practical measure for a commercial optical film. In addition, it is noted that PM has a different pore spacing and depth and is therefore not directly comparable.

Finally, while the invention has been particularly shown and described with respect to preferred embodiments thereof, it will be understood that changes in form and details may be made therein without departing from the scope and spirit of the invention.

What is claimed is:

1. A method of molding a polymeric material to create a desired texture therein using a mold having a plurality of cylindrical pores disposed therein, the method comprising the steps of:
   a) providing a porous master comprising aluminum having a plurality of cylindrical pores dispersed therein, said plurality of cylindrical pores corresponding to projections to be imparted to a surface of the polymeric material Wherein the cylindrical pores are prepared by steps comprising;
      i) performing a first stage anodization on the porous master;
      ii) oxide etching the porous master;
      iii) performing a second step anodization; and
      iv) performing a pore widening treatment;
   wherein the first stage anodization and oxide etching steps are each performed multiple times;
   b) applying a release agent to the porous master said release agent selected from the group consisting of alkylphosphonic acids, arylphosphonic acids, fluoroalkylsilanes, perfluorochlorosilianes, fluorinated alkyl and aryl phosphonic acids, organofunctional silanes and combinations of the foregoing;
   c) disposing a polymeric material between a transparent film or translucent film and the porous master; and
   d) applying mechanical pressure to roll the porous master into the polymeric material,
   wherein the texture imparted to the polymeric material comprises projections corresponding to the cylindrical pores of the porous master.

2. The method according to claim 1, wherein the release agent is an alkylphosphonic acid.

3. The method according to claim 1, wherein the alkylphosphonic acid is 1-decylphosphonic acid.

4. The method according to claim 3, wherein the 1-decylphosphonic acid is applied to the porous master by immersing the porous master in a solution of 0.1% 1-decylphosphonic acid in ethanol for a period of time.

5. The method according to claim 4, Wherein porous master comprises alumina.

6. The method according to claim 1, wherein, the release agent is a fluoroalkyl silane.

7. The method according to claim 6, wherein the fluoroalkyl silane is 1H,1H, 2H, 2-perfluorodecyltrichlorosilane.

8. The method according to claim 7, wherein the release agent is applied by baking the porous master in the presence of the 1H,1H, 2H, 2-perfluorodecyltrichlorosilane for at least one hour at a temperature of at least about 130° C.

9. The method according to claim 1, wherein the release agent is a functional perfluoropolyether material.

10. The method according to claim 9, wherein the release agent is a solution of a diphosphonate derivative based on a linear perfluoropolyether backbone in ethanol.

11. The method according to claim 10, wherein the porous master is contacted with the release agent by dipping the porous master in the release agent and then baking the porous master.

12. The method according to claim 1, wherein the polymeric material is a photosensitive resin.

13. The method according to claim 12, wherein the photosensitive resin is selected from the group consisting of acrylate resins, poly-methyl methacrylate resin, vinylchloride resins, polycarbonate resins, phenolic resins, epoxy resins and polyurethane resins, in combination with a photoinitiator.

14. The method according to claim 12, wherein the photosensitive resin is cured by UV light to create a thin solid coating of textured resin on the transparent film corresponding to the pores of the porous alumina mold.

15. The method according to claim 7, wherein the film is selected from the group consisting of methyl methacrylate (co)polymers, polycarbonates, styrene (co)polymers, methyl methacrylate-styrene copolymers, cellulose diacetates, cellulose triacetates, cellulose acetate butyrates, polyesters, polyamides, polyimides, polyether sulfones, polysulfones, polypropylenes, polymethylpentenes, polyvinylchlorides, polyvinyl acetals, polyetherketones, polyurethanes, and glass.

16. The method according to claim 15, wherein the film is polyethylene terephthalate.

17. The method according to claim 1, wherein the texture imparted to the polymeric material provides an anti-reflective layer.

18. The method according to claim 1, wherein the first stage anodization and oxide etching steps are each performed at least three times.

19. The method according to claim 1, wherein an electrolyte used in the first stage anodization step comprises phosphoric acid.

20. The method according to claim 19, wherein the concentration of phosphoric acid in the electrolyte is less than about 0.7 M.

* * * * *